United States Patent
Nixon et al.

(10) Patent No.: US 9,688,878 B2
(45) Date of Patent: Jun. 27, 2017

(54) POLYESTER POLYOL

(71) Applicant: AKZO NOBEL COATINGS INTERNATIONAL B.V., Arnhem (NL)

(72) Inventors: Steven Alister Nixon, Tyne and Wear (GB); Susan Pritchard, Tyne and Wear (GB)

(73) Assignee: AKZO NOBEL COATING INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/419,109

(22) PCT Filed: Aug. 7, 2013

(86) PCT No.: PCT/EP2013/066515
§ 371 (c)(1),
(2) Date: Feb. 2, 2015

(87) PCT Pub. No.: WO2014/023751
PCT Pub. Date: Feb. 13, 2014

(65) Prior Publication Data
US 2015/0218415 A1   Aug. 6, 2015

Related U.S. Application Data

(60) Provisional application No. 61/691,857, filed on Aug. 22, 2012.

(30) Foreign Application Priority Data

Aug. 10, 2012 (EP) .................................. 12180163

(51) Int. Cl.
*C09D 175/04* (2006.01)
*C09D 167/08* (2006.01)
(Continued)

(52) U.S. Cl.
CPC ....... *C09D 175/04* (2013.01); *C08G 18/4288* (2013.01); *C08G 18/792* (2013.01);
(Continued)

(58) Field of Classification Search
None
See application file for complete search history.

(56) References Cited

U.S. PATENT DOCUMENTS 4,040,995 A   8/1977   Sekmakas et al.
4,382,114 A   5/1983   Hohlein et al.
(Continued)

FOREIGN PATENT DOCUMENTS

DE      4328092      2/1995
DE   102009056187    7/2010
(Continued)

OTHER PUBLICATIONS

Database WPI; Week 200116; Thomson Scientific, London, GB;AN2001-152326; XP002712620, -& JP 2000 351935 A (Nippon Paint Co Ltd) Dec. 19, 2000 (Dec. 19, 2000).
(Continued)

*Primary Examiner* — Jeffrey Washville
(74) *Attorney, Agent, or Firm* — McDonnell Boehnen Hulbert & Berghoff LLP

(57) ABSTRACT

A coating composition having a solids content of greater than 70% by weight and/or a Volatile Organic Content (VOC) of less than 250 g/l, comprising a novel polyester polyol and a curing agent, wherein the coating composition is capable of curing at ambient temperature, and which provides a coating having excellent durability.

20 Claims, 1 Drawing Sheet

(51) Int. Cl.
*C09D 175/06* (2006.01)
*C08G 63/48* (2006.01)
*C08G 18/79* (2006.01)
*C08G 18/42* (2006.01)
*C08K 3/22* (2006.01)

(52) U.S. Cl.
CPC ........... *C08G 63/48* (2013.01); *C09D 167/08* (2013.01); *C09D 175/06* (2013.01); *C08K 2003/2241* (2013.01)

(56) References Cited

U.S. PATENT DOCUMENTS

| | | | |
|---|---|---|---|
| 5,214,086 A | | 5/1993 | Mormile et al. |
| 5,869,566 A | | 2/1999 | Thomas |
| 6,166,111 A | * | 12/2000 | Schneider ............ C09D 167/06 523/501 |
| 6,251,985 B1 | | 6/2001 | Wamprecht et al. |
| 2004/0157986 A1 | | 8/2004 | Winter et al. |
| 2004/0186247 A1 | | 9/2004 | Vandevoorde |
| 2005/0288478 A1 | | 12/2005 | Burgo |
| 2009/0028807 A1 | | 1/2009 | Giustiniani et al. |
| 2010/0041820 A1 | | 2/2010 | Eslinger et al. |
| 2011/0052903 A1 | * | 3/2011 | Van Oorschot .... C08G 18/0866 428/319.3 |

FOREIGN PATENT DOCUMENTS

| | | |
|---|---|---|
| EP | 0085776 | 8/1983 |
| GB | 1513769 | 6/1978 |
| JP | 2000351935 | 12/2000 |
| WO | WO93/17060 | 9/1993 |
| WO | WO96/02585 | 2/1996 |
| WO | WO98/16583 | 4/1998 |
| WO | WO99/29760 | 6/1999 |

OTHER PUBLICATIONS

European Search Report for Application No. 12180163.3-2102 dated Dec. 12, 2012.
International Search Report and Written Opinion for Application No. PCT/EP2013/066515 mailed on Sep. 27, 2013.

* cited by examiner

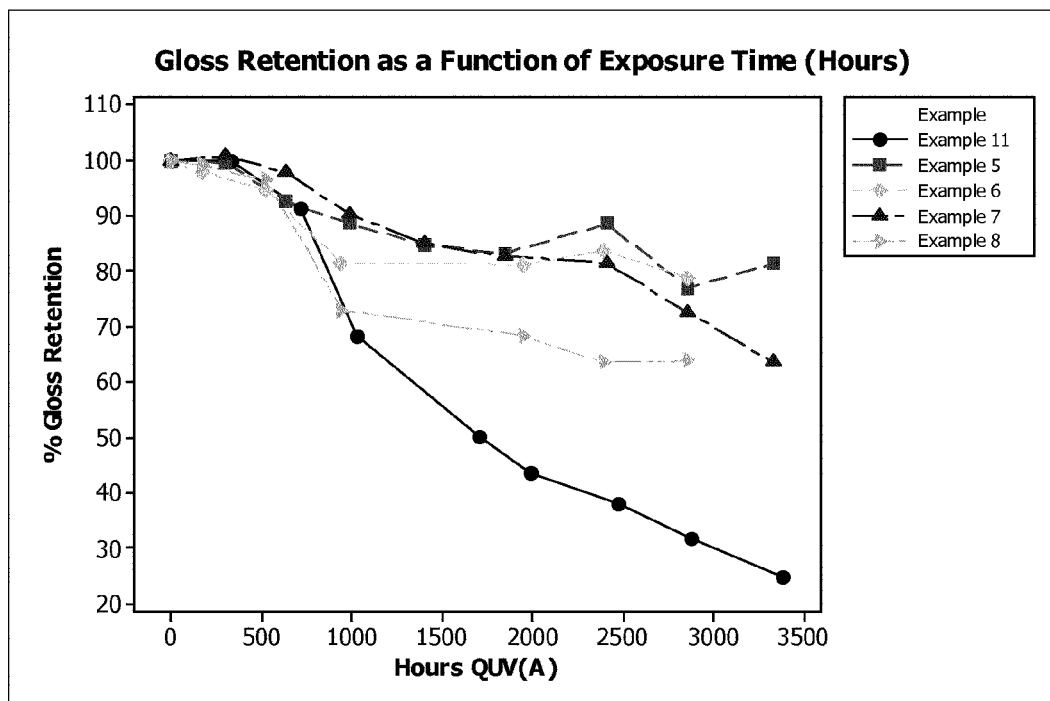

POLYESTER POLYOL

REFERENCE TO RELATED APPLICATIONS

This application is the U.S. National Phase of PCT/EP2013/066515, filed on Aug. 7, 2013, and claims the benefit of EP Application No. 12180163.3, filed on Aug. 10, 2012, and U.S. Provisional Application 61/691,857, filed on Aug. 22, 2012.

The present application provides novel polyester polyols, and coating compositions comprising these polyester polyols having a high solid content, low VOC, which cure quickly and have excellent durability.

Polyester polyols, and coating compositions comprising polyester polyols are known in the art.

US Patent Application No 2004/0186247 discloses coating compositions comprising polyester polyols, the polyester polyols being prepared from at least one polyol, at least one cyclic polycarboxylic acid and at least one monocarboxylic acid. In this case, it is taught that the polyol must have a hydroxyl value in the range of 200-400 mg KOH/g. All of the coating compositions disclosed in US Patent Application No 2004/0186247 are cured above ambient temperature, at 60° C., and all have a high Volatile Organic Content (VOC) of greater than 300 g/l. The inventors of the present invention have found that compositions comprising the polyester polyols having a hydroxyl value of less than 200 [mg KOH/g], prepared from the selection of reactants as claimed, surprisingly results in the coatings having a superior durability compared to coating compositions taught in US Patent Application No 2004/0186247 which have a hydroxyl value of 200 or more. The coating compositions of the present invention are able to cure quickly at ambient temperatures and have a lower VOC than the compositions exemplified in US Patent Application No 2004/0186247.

US Patent Application 2010/0041820 describes an air-drying alkyd-based coating composition comprising, as one of the components, a polyester polyol prepared from a plurality of unsaturated fatty acid esters. The presence of unsaturated carbon chains on the fatty acid esters is essential for the oxidative crosslinking mechanism of the alkyd coating composition of US Patent Application 2010/0041820. The present inventors have found however that one draw-back of the unsaturation is that it impairs the durability of the coating composition. The polyester polyols of the present invention are prepared from one or a mixture of substantially saturated and/or saturated $C_6$-$C_{18}$ monobasic fatty acid(s), the one or the mixture of monobasic fatty acid(s) being a liquid; consequently the coating compositions comprising these polyester polyols have been found to have superior durability.

U.S. Pat. No. 6,251,985 discloses an aqueous coating composition comprising a polyester polyol and a polyisocyanate component. U.S. Pat. No. 5,869,566 discloses a coating composition comprising an active hydrogen group-containing polymer (amongst other things, the active hydrogen group-containing polymer may include polyester polyols), and a poly-isocyanate curing agent. Both US patents describe an enormous number of examples of monomers/components which could be used to prepare the polyester polyol. There is no suggestion that the combination of components as presently claimed, could be used to prepare polyester polyol(s) for use in high solids, low VOC coating compositions which have excellent durability.

DE 43 28 092 A1 discloses a low solids water-based multi-layer coating system. The base coat layer of the coating system is derived from a urethane-modified polyester and/or a urethane-modified alkyd. The base coating layer may optionally comprise a curing agent which is a blocked polyisocyanate or aminoplast curing agent. However blocked polyisocyanate or aminoplast crosslinking agents are well known in the art to require heat to effect curing. The coating compositions of the examples of DE 43 28 092 are therefore cured with heat. There is no suggestion in DE 4328 092 A1 that the combination of components as presently claimed, could be used to prepare polyester polyol(s) for use in high solids coating compositions, which are capable of being cured at ambient temperature, and which have excellent durability.

Like DE 43 28 092 A1, U.S. Pat. No. 6,166,111 A, U.S. Pat. No. 4,040,995, GB1513769 and WO99/29760 also disclose coating compositions which require heat to cure. There is nothing in these documents which teach or suggest how to prepare an ambient temperature curable coating composition having a high solids/low VOC and excellent durability.

The present invention relates to a coating composition comprising a polyester polyol and novel polyester polyols that overcome the disadvantages associated with the prior art. The coating compositions, of the present invention, when catalysed, are fast curing at ambient temperature (even to the extent that they can dry within less than 4 hours at temperatures ranging from 10° C. to 30° C.), with a high solids content (greater than 70% by weight) and have a low VOC (less than 250 grams of solvent per liter of the composition g/l) are capable of forming good films, and in particular have been found to have excellent durability compared to compositions of the prior art.

The coating composition according to the present invention has a solids content of greater than 70% by weight and/or a Volatile Organic Content of less than 250 g/l, and comprises a polyester polyol prepared from the following reactants comprising:

(a) from about 10 to about 40 weight percent of one or more polyols comprising 3 or more hydroxyl groups per molecule, (b) from about 10 to about 40 weight percent of one or more polycarboxylic acid(s) comprising 2 or more acid groups per molecule or the corresponding ester(s) and/or anhydride(s) thereof, and (c) from about 30 to about 75 weight percent of one or a mixture of saturated and/or substantially saturated $C_6$-$C_{20}$ monobasic fatty acids, wherein the one or the mixture of saturated and/or substantially saturated monobasic $C_6$-$C_{20}$ fatty acids is/are a liquid, wherein the polyester polyol has a hydroxyl value (OHV) of greater than 60 and less than 200 mgKOH/g, and the weight percent of each component (a), (b) or (c) is the percentage of the weight of that component to the total weight of (a)+(b)+(c), and a curing agent, and wherein the coating composition is capable of curing at ambient temperature.

Preferably coating composition according to the present invention has a solids content of greater than 70% by weight and/or a Volatile Organic Content of less than 250 g/l, and comprises a polyester polyol prepared from the following reactants comprising: (a) from about 10 to about 40 weight percent of one or more polyols comprising 3 or more hydroxyl groups per molecule; (b) from about 10 to about 30 weight percent of one or more polycarboxylic acid(s) comprising 2 or more acid groups per molecule or the corresponding ester(s) and/or anhydride(s) thereof; and (c) from about 35 to about 75 weight percent of one or a mixture of saturated and/or substantially saturated $C_6$-$C_{20}$ monobasic fatty acids, wherein the one or the mixture of saturated and/or substantially saturated monobasic $C_6$-$C_{20}$ fatty acids is/are a liquid; wherein the polyester polyol has a hydroxyl value (OHV) of greater than 60 and less than 200 mgKOH/g, and the weight percent of each component (a), (b) or (c) is the percentage of the weight of that component to the total weight of (a)+(b)+(c);

a curing agent, and wherein the coating composition is capable of curing at ambient temperature.

A coating composition that is capable of curing at ambient temperature (or "in ambient conditions") is a coating composition that requires no artificial heating to effect curing. The coating of the present invention is therefore capable of curing to form a coating film on a substrate once it has been applied with no additional heating. Ambient temperature is also commonly known in the art to be temperatures ranging from 0° C. to 30° C.

The coating composition of the present invention generally hardens sufficiently rapidly at ambient temperature, so that a film of a typical dry film thickness of 40-400 μm is dry in accordance with ASTM D 5895 as measured by BK dry track recorder after application after 12 hours, and even after 8 or 6 hours. For a top coat, the typical dry film thickness of the coating is between 40-100 μm. For a primer coating or a primer-top-coat, the typical dry film thickness of the coating is between 100-500 μm The amounts of components (a) (b) and (c) used to prepare the polyester polyol must therefore be selected so that the polyester polyol has an OHV of greater than 60 and less than 200 mg KOH/g (this corresponds to a hydroxyl equivalent weight range of 290-920 g/equiv.) Preferably the OHV is 70 to 190 mg KOH/g. Most preferably the OHV is 70-100 mg KOH/g.

The hydroxyl value may be determined experimentally according to ASTM Method E222 (revision 10), Test Method A.

The hydroxyl value (OHV) is the milligrams of potassium hydroxide equivalent to the hydroxyl content in one gram of polyol.

i.e. Hydroxyl number=56.1×1000/hydroxyl equivalent weight, where 56.1 is the atomic weight of potassium hydroxide, 1000 is the number of milligrams in one gram of sample and the hydroxyl equivalent weight is the grams of a polyol you need to have for one equivalent of reactive OH groups.

It is well known in the technical field of coatings that the theoretical hydroxyl value (OHV) of a polyester polyol can be easily calculated when the reactants and their amounts used to prepare the polyester polyol are known.

For example, if you consider the polyester formulation from Example 1 of the present application, this formulation contains 37.40 g of pentaerythritol, 30.71 g of isophthalic acid, and 83.70 g of Edenor V85 (Mixture of C8-C10 saturated fatty acids–acid value=359–367).

Pentaerythritol has a molecular mass of 136.15 g/mol and contains four hydroxyl groups per molecule. The formulation therefore contains 0.274 (37.4/136.15) moles of pentaerythritol, contributing 1.096 (0.274*4) equivalents of hydroxyl to the formulation.

Isophthalic acid has a molecular mass of 166 g/mol and contains 2 acid groups per molecule. The formulation therefore contributes 0.185 moles (30.71/166) of isophthalic acid, which is equal to 0.37 (0.185*2) equivalents of carboxylic acid.

Edenor V85 (using the mid-point of the acid value specification=>363 mgKOH/g, the calculated acid equivalent weight is 155 g, which gives a calculated molar mass of 155 g/mol) contributes 0.54 moles (83.70/155) of fatty acids, which is equal to 0.54 equivalents of carboxylic acid.

The formulation of Example 1 therefore contains a total of 1.096 equivalents of hydroxyl to 0.91(0.37+0.54) equivalents of carboxylic acid, hence there is an excess of hydroxyl groups in the formulation, and the polyester will be hydroxyl functional.

The expected yield of the polyester is the sum of the weights of the monomers (37.40 g+30.71 g+83.70 g=151.81 g) less the amount of water (molecular mass of 18) removed during the polymerisation (18*0.91=16.38 g). In this case the expected yield is 135.4 g (151.81-16.38).

At 100% reaction of the carboxylic acid, the number of equivalents of unreacted hydroxyl groups is 0.186 (1.096–0.91=0.186). In this formulation, the polyester (at 100% reaction of the carboxylic acid) will have a hydroxyl equivalent weight of 728.1 g (135.43/0.186). The hydroxyl value of the polymer is therefore 77.0 mgKOH/g (56100/728.1).

Preferably, the coating composition of the present invention comprises a volatile organic content (VOC) of less than 250 grams of solvent per liter of the composition (g/l) and/or the solids content of a composition higher than 75% by weight, preferably higher than 80% by weight, based on the total weight of all the coating composition.

The volume solids content of the coating composition may be determined according to ASTM method D2697.

The Volatile Organic Content (VOC) of the coating composition may be determined according to EPA Federal Method 24.

In all embodiments, preferably the acid value of the polyester polyol is less than about 10, preferably less than 5.

The polyester polyol of the present invention, is prepared from reactants comprising from about 10 to about 40 weight percent of one or more polyols comprising 3 or more hydroxyl groups per molecule (component (a)), from about 10 to about 40 weight percent of one or more polycarboxylic acid(s) comprising 2 or more acid groups per molecule or the corresponding ester(s) and/or anhydride(s) thereof (component (b)), and from about 30 to about 75 weight percent of one or a mixture of saturated and/or substantially saturated $C_6$-$C_{20}$ monobasic fatty acids, wherein the one or the mixture of saturated and/or substantially saturated monobasic $C_6$-$C_{20}$ fatty acids is a liquid (component (c)), wherein the weight percent of component (a), (b) or (c) is the percentage of the weight of that component to the total weight of (a)+(b)+(c), and wherein the polyester polyol has a hydroxyl value (OHV) of greater than 60 and less than 200 mgKOH/g.

Preferably the polyester polyol is prepared from reactants comprising from about 10 to about 40 weight percent of component (a) from about 10 to about 30 weight percent of component (b); and from about 35 to about 75 weight percent of component (c); wherein the weight percent of each component (a), (b) or (c) is the percentage of the weight of that component to the total weight of (a)+(b)+(c). and wherein the polyester polyol has a hydroxyl value (OHV) of greater than 60 and less than 200 mgKOH/g The polyester polyol of the present invention may be prepared from reactants consisting essentially of from about 10 to about 40 weight percent of one or more polyols comprising 3 or more hydroxyl groups per molecule (component (a)), from about 10 to about 30 weight percent of one or more polycarboxylic acid(s) comprising 2 or more acid groups per molecule or the corresponding ester(s) and/or anhydride(s) thereof (component (b)), and from about 35 to about 75 weight percent of one or a mixture of saturated and/or substantially saturated $C_6$-$C_{20}$ monobasic fatty acids, wherein the one or the mixture of saturated and/or substantially saturated monobasic $C_6$-$C_{20}$ fatty acids is a liquid (component (c)), wherein the weight percent of component (a), (b) or (c) is the percentage of the weight of that component to the total weight of (a)+(b)+(c), and wherein the polyester polyol has a hydroxyl value (OHV) of greater than 60 and less than 200 mgKOH/g.

i.e.:

$$\text{Weight percent of component} = \frac{\text{the weight of component}}{\text{weight of } (a) + (b) + (c)} \times 100$$

For all embodiments preferably the weight % of component (a) ranges from 17 to 30.

For in all embodiments preferably the weight % of component (b) ranges from 14 to 25.

For all embodiments preferably the weight % of component (c) ranges from 46 to 67.

Alternatively, for all embodiments, the weight % of component (a) ranges from 20 to 40; the weight % of component (b) ranges from 20 to 40; and the weight % of component (c) ranges from 30 to 60.

In one embodiment, the one or more polyols comprising 3 or more hydroxyl groups may be one or more of aliphatic polyols having 2-14 carbon atoms. Examples of polyols comprising 3 or more hydroxyl groups include glycerol, trimethylol ethane, trimethylol propane, 1,2,6-hexanetriol, pentaerythritol, tripentaerythritol, dipentaerythritol, trimethylol propane, propoxylated pentaerythritol, ethoxylated pentaerythritol, ethoxylated trimethylol propane, xylitol, sorbitol, glucose, fructose and sucrose.

In a particularly suitable embodiment, the one or more polyol(s) comprising 3 or more hydroxyl groups comprises pentaerythritol, trimethylolpropane and glycerol, most preferably pentaerythritol.

The one or more polyols comprising 3 or more hydroxyl groups may be prepared in-situ, for example, from the corresponding epoxy-functional compounds.

The one or more polycarboxylic acid(s) comprising 2 or more acid groups per molecule include cyclic polycarboxylic acids and the esters or the anhydrides thereof, and acyclic polycarboxylic acids and the esters or the anhydrides thereof.

Examples of cyclic polycarboxylic acids include aromatic polycarboxylic acids and cycloaliphatic polycarboxylic acids.

Examples of aromatic polycarboxylic acids include isophthalic acid, phthalic acid, terephthalic acid, phthalic anhydride and trimellitic anhydride.

Examples of cycloaliphatic polycarboxylic acids include 1,2-cyclohexane dicarboxylic acid, 1,3-cyclohexane dicarboxylic acid, tetrahydrophthalic acid, endomethylene tetrahydrophthalic acid, hexahydrophthalic acid and methyl hexahydrophthalic acid, and the esters or the anhydrides thereof, such as tetrahydrophthalic anhydride, endomethylene tetrahydrophthalic anhydride, hexahydrophthalic anhydride and methyl hexahydrophthalic anhydride.

Examples of acyclic polycarboxylic acids include malonic acid, succinic acid, glutaric acid, adipic acid, octenyl succinic acid, dodecenyl succinic acid, azelaic acid, sebacic acid, and the esters or the anhydrides thereof, such as dimethyl ester and diethyl ester of malonic acid, succinic anhydride, octenyl succinic anhydride, and dodecenyl succinic anhydride.

In a preferred embodiment, the one or more polycarboxylic acid(s) comprising 2 or more acid groups per molecule comprises aromatic dicarboxylic acids, or their corresponding esters/anhydrides thereof. Examples of aromatic dicarboxylic acids include isophthalic acid, terephthalic acid and phthalic acid.

In a particularly suitable embodiment, at least 50 mole % of the one or more polycarboxylic acid(s) comprising 2 or more acid groups per molecule is isophthalic acid and/or the corresponding esters thereof.

The polyester polyol is prepared from one or a mixture of saturated and/or substantially saturated $C_6$-$C_{20}$ monobasic fatty acids, wherein the one or the mixture of saturated and/or substantially saturated monobasic $C_6$-$C_{20}$ fatty acids is/are a liquid The extent of saturation of a compound is definable by an iodine value. By substantially saturated we mean that the fatty acid(s) have an iodine value of less than 30 cg/g. The iodine value, is the amount of iodine, in centigrams, that is taken up by 1 gram of the fatty acid or mixture of fatty acid(s) (due to the presence of unsaturated bonds) as measured according to ASTM method D5768-02(2010).

Preferably, the one or a mixture of saturated and/or substantially saturated $C_6$-$C_{20}$ fatty acids has an iodine value of less than 50 cg/g, more preferably of less than 20 cg/g and most preferably less than 10 cg/g.

By liquid we mean a liquid material defined in conformity with ASTM (1996) D4359-90: Standard Test Method for Determining Whether a Material is a Liquid or a Solid. In this test method the material under test is held in a tightly closed can at 38° C. The lid is removed and the can inverted. The flow of the material from the can is observed to determine whether it is solid or a liquid. A material that flows for a total of 50 mm or less within 3 minutes is considered a solid. Otherwise it is considered a liquid. In one embodiment, the one or the mixture of saturated and/or substantially saturated $C_6$-$C_{18}$ fatty acids is one or a mixture of $C_6$-$C_{10}$ saturated and/or substantially saturated fatty acids. Preferably, the one or the mixture of saturated and/or substantially saturated $C_8$-$C_{18}$ fatty acids is one or a mixture of $C_8$-$C_{10}$ saturated and/or substantially saturated fatty acids.

Shorter chain saturated and/or substantially saturated monobasic fatty acids (for example $C_6$, $C_7$, $C_8$ $C_9$, $C_{10}$, $C_{11}$ saturated and/or substantially saturated monobasic fatty acids) are liquids in accordance ASTM (1996) D4359-90. As the carbon chain in the monobasic fatty increases in length, the viscosity of the fatty acids increases until they are no longer liquids, but waxy solids. For example, pure stearic acid ($C_{18}$) is considered to be a waxy solid in the context of the present invention; the use of pure stearic acid to prepare a polyester polyol is therefore outside the scope of the present invention.

However, mixtures of shorter chain (e.g. $C_8$-$C_{11}$) and longer chain (e.g. $C_{12}$-$C_{20}$) saturated and/or substantially saturated monobasic fatty acids may be used, provided that the mixture of the fatty acids are a liquid in accordance with ASTM method D5768-02(2010).

In preferred embodiments, the one or the mixture of saturated and/or substantially saturated $C_6$-$C_{20}$ fatty acids is: one or a mixture of $C_8$-$C_{18}$ saturated and/or substantially saturated fatty acids, or one or a mixture of $C_8$-$C_{14}$ saturated and/or substantially saturated fatty acids, or one or a mixture of $C_6$-$C_{10}$ saturated and/or substantially saturated fatty acids, or most preferably, one or a mixture of $C_8$-$C_{10}$ saturated and/or substantially saturated fatty acids, provided that the one or the mixture of saturated and/or substantially saturated fatty acids are/is a liquid in accordance with ASTM method D5768-02(2010).

Mixtures of $C_6$-$C_{10}$ saturated fatty acids are commercially available as a liquid, for example, Edenor V85 available from Emery Oleochemicals.

Optionally, the coating composition comprises one or more polyols comprising less than 3 hydroxyl groups per molecule, for example 2 hydroxyl groups (diols) or 1 hydroxyl group (mono-alcohols) per molecule. These polyols may be linear and/or branched, aliphatic and/or aromatic. Examples of diols include aliphatic $C_1$-$C_{10}$ aliphatic diols, for example: 1,2-ethanediol, 1,2-propanediol, 1,3-propanediol, 3-methyl-1,3-propanediol, 2-butyl-2-ethyl-1,3-propanediol, dimethylol propionic acid, 1,4-cyclohexanedimethanol and neopentyl glycol.

The polyester polyol preferably has a number average molecular weight (Mn) ranging from 1000 to 5000, preferably 1500 to 2500.

The number average molecular weight numbers can be measured using gel permeation chromatography in accordance with ASTM method D5296-11.

The polyester polyol is prepared from the one or more polyols, the one or the mixture of polycarboxylic acid(s), and the one or a mixture of saturated and/or substantially saturated monobasic fatty acids by standard condensation methods. In one method, the fatty acid(s) is/are charged to the reaction vessel fitted with a Dean and Stark apparatus an overhead stirrer and a thermocouple; the polycarboxylic acid(s), polyol(s) and optionally a catalyst are dispersed in the liquid fatty acid(s). Optionally an antioxidant such as triphenyl phosphine is added, to reduce the discolouration of the product. The reaction temperature is raised slowly to a maximum temperature of 240° C. whilst keeping the reaction mixture under an inert nitrogen atmosphere. Water is distilled from the reaction mixture to promote the esterification reaction. The reaction mixture is processed to an acid value of <5 mgKOH/g, xylene or other azeotroping solvents can be added to facilitate removal of water to achieve the target acid value. The polyester is then cooled to room temperature and can, optionally, be diluted with solvent if required.

The viscosity of an undiluted polyester polyol according to the present invention preferably is 10-200 Poise at room temperature (25° C.). Advantageously, the polyester polyols of the present invention can be readily formulated into paint compositions with a maximum viscosity of about 15 poise at room temperature (25° C.) that can be used to formulate coatings with a volume solids content of >70 wt % and more preferably >75 wt %, >80 wt %, or >85 wt %.

Advantageously, the polyester polyols of the present invention can be readily formulated into paint compositions with a maximum viscosity of 20 poise at room temperature (25° C.) and a volume solids content of >70 wt % and more preferably >75 wt %, >80 wt %, and most preferably >85 wt %.

Viscosities in accordance with the present application are determined as high shear viscosities measured with a cone and plate viscometer. High shear viscosities can, for example, be measured using a high shear viscometer in accordance with ASTM D 4287 00 with a shear rate of 10,000-12,000 $s^{-1}$.

A mix viscosity of 6 poise or less (@ 25° C.) is acceptable for airless spray application whilst a mix viscosity of greater than 6 poise up to 20 poise (@ 25° C.) is acceptable for brush or roller application. The viscosity of the coating compositions is therefore suitable so that it can applied to a substrate by conventional means such as by spray gun, brush, or roller, spraying being preferred.

As already mentioned herein, the coating composition comprises a polyester polyol and a curing agent. The curing agent may be one or more curing agents. When the polyester polyol and curing agent are mixed together and then applied to a substrate, the curing agent reacts with the polyester polyol to form a cured coating layer on the substrate.

Curing agents capable of reacting with the hydroxyl groups on the polyester polyol to form a cured coating layer must comprise at least one hydroxyl-reactive group. Examples of preferred hydroxyl-reactive groups are isocyanate groups and anhydride groups. Examples of preferred curing agents for curing the polyester polyol of the present invention are therefore polyisocyanate curing agents and polyanhydride curing agents.

Preferred polyanhydride curing agents are polymers containing anhydride functional groups.

Preferably, the curing agent is one or more isocyanate-functional species/curing agent(s).

Examples of isocyanate compounds that can act as isocyanate-functional curing agents include aliphatic, alicyclic, and aromatic polyisocyanates. For example, trimethylene diisocyanate, 1,2-propylene diisocyanate, tetramethylene diisocyanate, 2,3-butylene diisocyanate, hexamethylene diisocyanate, octamethylene diisocyanate, 2,4-trimethyl hexamethylene diisocyanate, 2,4,4-trimethylhexamethylene diisocyanate, dodecamethylene diisocyanate, alpha,alpha'-dipropyl ether diisocyanate, dimeric acid diisocyanate, such as DDI 1410 ex Henkel, 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, norbornane diisocyanate, m- and p-phenylene diisocyanate, 1,3- and 1,4-bis(isocyanate methyl)benzene, 1,5-dimethyl-2,4-bis (isocyanate methyl)benzene, 1,3,5-triisocyanate benzene, 2,4- and 2,6-toluene diisocyanate, 2,4,6-toluene triisocyanate, alpha,alpha,alpha',alpha'-tetramethyl o-, m-, and p-xylylene diisocyanate, 4,4'-diphenylene diisocyanate methane, 4,4'-diphenylene diisocyanate, 3,3'-dichloro-4,4'-diphenylene diisocyanate, naphthalene-1,5-diisocyanate, isophorone diisocyanate, 4-isocyanatomethyl-1,8-octamethylene diisocyanate, and mixtures of the aforementioned polyisocyanates.

Other isocyanate compounds are the adducts of polyisocyanates, e.g., biurets, isocyanurates, allophanates, uretdiones, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate, available from Bayer under the trade designation Desmodur (Registered trademark N3390), a mixture of the uretdione and the isocyanurate of hexamethylene diisocyanate, available from Bayer under the trade designation Desmodur (Registered trademark N3400), the allophanate of hexamethylene diisocyanate, available from Bayer under the trade designation Desmodur (Registered trademark LS 2101), and the isocyanurate of isophorone diisocyanate, available from Hüls under the trade designation Vestanat T1890. Furthermore, (co)polymers of isocyanate-functional monomers such as alpha,alpha'-dimethyl-m-isopropenyl benzyl isocyanate are suitable for use.

The amount of polyester polyol and curing agent in the coating composition is such that the stoichiometric ratio of hydroxyl-reactive groups of the curing agent (e.g. isocyanate groups) to hydroxyl groups of the polyester polyol ranges from 0.5:1 to 2.5:1, preferably from 0.7:1 to 2:1, most preferably 0.9:1 to 1.1:1.

Optionally, other compounds may be present in the coating composition according to the present invention. Such compounds may be binders and/or reactive diluents comprising reactive groups, which may be cross-linked with the aforesaid polyester oligomer and polyisocyanate. Examples include hydroxyl-functional binders, e.g., polyester polyols, polyether polyols, polyacrylate polyols, polyester polyacrylate hybride polyols, polyurethane polyols, polyester urethane polyols, polyurea polyol, cellulose acetobutyrate, hydroxyl-functional epoxy resins, alkyds, and dendrimeric polyols such as described in WO 93/17060. Also, hydroxyl-functional oligomers and monomers, such as castor oil, trimethylol propane may be present. Finally, ketone resins, aspartic esters, and latent or non-latent amino-functional compounds such as oxazolidines, ketimines, aldimines, secondary amines, and polyamines may be present. These and other compounds are known to the skilled person and are mentioned, int. al., in U.S. Pat. No. 5,214,086. Preferably, polyacrylate polyols, polyester polyols, oxazolidines such as Incozol 2,LV,EH 4 (Registered trademark LV ex Industrial Copolymers Ltd) and Zoldine RD20 ex Angus Chemical Company, ketimines such as the ketimine of isophorone diamine and methyl isobutyl ketone available as Desmophen VP LS 2965 ex Bayer, aldimines such as the aldimine of isophorone diamine and isobutyraldehyde available as Desmophen VP LS 2142 ex Bayer, the aspartic ester Desmophen VP LS 2973 ex Bayer, and mixtures thereof may be added to the coating composition of the present invention.

The coating compositions according to the present invention are solvent borne. Preferably, the coating compositions comprise one or more organic solvents; more preferably, the coating compositions are high solids compositions comparing no or only up to 20 wt % organic solvent, based on the total coating composition. Examples of suitable solvents include aliphatic and aromatic hydrocarbons such as Solvesso (Registered Trade Mark), toluene, and xylene, alcohols such as butanol and propylene glycol monomethylether, esters such as butyl acetate, ethyl acetate, methoxy propyl acetate and ethoxy ethyl propionate, ketones such as acetone, methyl isobutyl ketone, methyl amyl ketone, and methyl ethyl ketone, or a mixture of any of these.

Optionally, a curing agent system according to the present invention comprises a catalyst. Catalysts for speeding the cure of hydroxyl-reactive groups (e.g. isocyanate groups) and hydroxyl groups are known to the skilled person. Examples of the catalyst include tin (IV) catalysts for example dimethyl tin dilaurate, dibutyl tin dilaurate, dibutyl tin diacetate and tin octoate, guandine, substituted guanidines catalysts e.g. tetramethylguanidine, zinc octoate, zirconium octoate, aluminium chelate, dimethyl tin dichloride, triethyl amine, triethylene diamine, 1,8-diazabicyco[5.4.0]undec-7-ene and 1,5-diazabicyclo[4.3.0]non-5-ene and mixtures thereof.

Preferred catalysts are tin(IV) catalysts or guanidine catalysts.

When catalysts are incorporated in the curing agent system, the coating compositions are capable of curing below ambient temperatures. For example, the coating compositions of the present invention may cure at temperatures below 10° C., and down to 5° C. or lower (i.e. the compositions can even cure in sub-ambient temperature).

In one embodiment, the catalyst is used in an amount of 0 to 10 mole %, preferably 0.001 to 5 mole %, more preferably in an amount of 0.01 to 3 mole %, of the total number of moles of hydroxyl groups in the paint formulation.

The coating compositions of the invention may contain one or more further ingredients. They may contain one or more pigments, for example titanium dioxide (white pigment), coloured pigments such as yellow or red iron oxide or a phthalocyanine pigment and/or one or more strengthening pigments such as micaceous iron oxide or crystalline silica and/or one or more anticorrosive pigments such as metallic zinc, zinc phosphate, wollastonite or a chromate, molybdate or phosphonate and/or a filler pigment such as barytes, talc or calcium carbonate.

The pigment volume concentration of the coating composition of the invention is preferably in the range of from 10-30%.

The composition may contain a thickening agent such as fine-particle silica, bentonite clay, hydrogenated castor oil, or a polyamide wax. The composition may also contain a plasticiser, pigment dispersant, stabiliser, flow aid, deaerator, defoamer, hindered amine light stabilizers, UV absorbers or thinning solvent.

Herein described is the use of the coating composition for coating a substrate. The present invention relates to a substrate coated with a coating composition. The substrate may be, for example, metal, plastic, wood, glass, ceramic, or another coating layer. Preferably, the substrate is another coating layer or steel. The other coating layer may be comprised of the coating composition of the current invention or it may be a different coating composition (e.g. a primer coating layer, or an intermediate coating layer).

The coating composition of the present invention may be applied to the substrate as one or more coating layer(s). The total dry film thickness of the one or more coating layer(s) formed from the coating composition of the present invention may be between 40-500 μm.

The coating compositions of the current invention show particular utility as a top-coat having high durability. The term "top-coat" is to be understood it's usual sense, that it is the final coating layer of the coating system applied to the substrate. i.e. no further coating layers are applied on top of it.

The polyester polyol and the curing agent are packaged separately and are mixed shortly before the coating is to be applied to a substrate, allowing curing of the coating composition (by reaction of the curing agent and polyester polyol) under ambient temperature.

The components of a coating composition according to the present invention are therefore preferably packed together as a so-called two-pack composition. One embodiment of the present invention therefore relates to a two-pack composition. One pack comprises one or more of curing agent(s) (e.g. a curing agent comprising hydroxyl-reactive groups), and the other pack comprises the polyester polyol.

As previously mentioned herein, one advantage of the coating compositions of the invention is that they are capable of curing at ambient temperature, for example temperatures in the range from 0° C. to 30° C., for example at a temperature of around 10° C., and thus are suitable for application to large structures where heat curing is impractical. The coating compositions of the invention alternatively can be cured at elevated temperatures, for example temperatures in the range from 30° C. or from 50° C. to 80° C. up to 100° C. or 130° C., to speed up curing, although this is not necessary and impractical is applying to large structures.

The present invention also relates to substrate(s) coated with a coating composition as defined above, and the use of the coating composition for coating a substrate.

Another embodiment of the present invention is a method of coating a substrate by applying by applying the coating composition as defined herein to the substrate, and allowing the coating composition to cure at an ambient temperature to form a coating layer on the substrate.

The invention will be elucidated with reference to the following examples. These are intended to illustrate the invention but are not to be construed as limiting in any manner the scope thereof.

EXAMPLES

Test Methods Used in the Examples

The Non Volatile Content (NVC/% solid content) was determined by placing a known weight (0.3 g) of polymer solution into a pre-weighed aluminum dish and heating the sample in an oven at 105° C. for 30 minutes and reweighing the dish. The non volatile content can be calculated from the difference in weight between the pre-heated and post-heated sample (ASTM method D2697).

The viscosity was measured using a high shear viscometer in accordance with ASTM D 4287 00 with a shear rate of 10,000-12,000 $s^{-1}$.

The Volatile Organic Content (VOC) of the coating composition was determined according to EPA Federal Method 24.

The time for the coatings to dry was measured by BK dry track recorder (ASTM D 5895).

Examples 1-4

Preparation of Polyester Polyols According to the Invention

TABLE 1 amounts of each reagent (grams) used to prepare the polyester polyols of Examples 1-4

| | Polyester Polyol | | | |
|---|---|---|---|---|
| | Example 1 | Example 2 | Example 3 | Example 4 |
| Pentaerythritol | 37.40 | 39.55 | 43.29 | 44.88 |
| Isophthalic Acid | 30.71 | 34.43 | 34.14 | 36.52 |
| Edenor V85 | 83.70 | 77.78 | 73.79 | 69.75 |
| Dibutyl tin oxide | 0.15 | 0.15 | 0.15 | 0.15 |

The polyester polyols of Examples 1-4 were prepared from the polyols, polycarboxylic acids, fatty acids and dibutyl tin oxide as listed in Table 1 according to the following procedure.

For each Example, the Edenor V85 was charged to a reaction vessel fitted with a Dean and Stark apparatus, an overhead stirrer, a source of nitrogen, and a thermocouple. The polycarboxylic acid(s), polyol(s) and catalyst were dispersed in the liquid fatty acids. The reaction temperature was raised slowly to a maximum temperature of 240° C. whilst keeping the reaction mixture under an inert nitrogen atmosphere. Water was distilled from the reaction mixture to promote the esterification reaction. The reaction mixture was processed to an acid value of <5 mgKOH/g. (An azeotropic solvent may be added to aid removal of water in the latter stages of the reaction.) The polyester was cooled to 50° C. and diluted in xylene to a nominal 80% w/w solids.

Each of the polyester polyols were liquids having the measured viscosities, measured NVC, and theoretical OHV presented in Table 2.

TABLE 2

| | Polyester Polyol | | | |
|---|---|---|---|---|
| | Example 1 | Example 2 | Example 3 | Example 4 |
| Non Volatile Content (NVC) (wt %) | 81.8 | 79.7 | 80.4 | 80.2 |
| Viscosity (poise) | 9.4 | 17.1 | 24.1 | 14.5 |
| Theoretical OHV (at 100% solids) | 77.0 | 102.3 | 160.1 | 192.0 |

Examples 5-8

Preparation of Simple Paints and Cured Coatings

TABLE 3

| | Paint | | | |
|---|---|---|---|---|
| | Example 5 | Example 6 | Example 7 | Example 8 |
| Polyester polyol | Example 1 | Example 2 | Example 3 | Example 4 |
| Polyester polyol Solution Weight (g) | 95.31 | 91.92 | 79.42 | 74.49 |
| Titanium Dioxide Weight (g) | 41.00 | 41.00 | 41.00 | 41.00 |
| Xylene Weight (g) | 7.62 | 6.34 | 9.42 | 10.03 |
| Mix Ratio of Paint Base:Desmodur N3300 by weight * | 3.70 | 2.85 | 1.82 | 1.51 |

* stoichiometric ratio of OH:NCO was 1:1

The paints of Examples 5-8 were prepared using the polyester polyol solution, titanium dioxide and xylene in the amounts listed in Table 3 according to the following procedure.

For each of the paints, the titanium dioxide was added slowly to the stirred polyester polymer solution and dispersed under high shear until the pigment had a particle size of less than 20 μm (as measured by Hegman gauge). The xylene was added to thin the paint.

To prepare the cured coating, the paints of Examples 5-8 were mixed with Desmodur N3300 (a hexamethylenediisocyanate trimer curing agent commercially available from Bayer). The viscosity of the mixed paint ("mix viscosity") was measured. The dry time of the coatings were measured by BK dry track recorder (ASTM D 5895). These measurement values are provided in Table 4 together with the calculated VOC and volume solids of each coating composition.

TABLE 4

| | Paint | | | |
|---|---|---|---|---|
| | Example 5 | Example 6 | Example 7 | Example 8 |
| Mix Viscosity (poise at 25° C.) | 6.9 | 4.6 | 10.5 | 6.5 |
| VOC (g/l) | 208 | 194 | 199 | 197 |
| Solids Content (wt %) | 75.7 | 77.4 | 76.8 | 77.1 |
| Dry Time (hours @ 25° C.) | 4 | 6 | 2 | 3 |

Comparative Example 9

Preparation of a Comparative Polyester Polyol Using a Non-Liquid Fatty Acid

TABLE 5

| Formulation of Polyester polyol of comparative Example 9 | |
| --- | --- |
| | Weight (g) |
| Pentaerythritol | 106.0 |
| Isophthalic Acid | 57.5 |
| Stearic Acid | 336.5 |
| Dibutyl tin oxide | 0.5 |

The stearic acid (waxy solid) was charged to a reaction vessel fitted with a Dean and Stark apparatus, an overhead stirrer, a nitrogen source, and a thermocouple and warmed to melt it; the polycarboxylic acid(s), polyol(s) and catalyst were dispersed in the liquid fatty acid. The reaction temperature was raised slowly to a maximum temperature of 240° C. whilst keeping the reaction mixture under an inert nitrogen atmosphere. Water was distilled from the reaction mixture to promote the esterification reaction. The reaction mixture was processed to an acid value of <5 mgKOH/g. (An azeotropic solvent may be added to aid removal of water in the latter stages of the reaction.) The polyester was cooled to 50° C. and diluted in xylene to a nominal 77% w/w solids.

The product was a waxy solid with a theoretical hydroxyl value (at 100% solids) of 150 mg KOH/g.

It was not possible to formulate the polyester polyol into a coating composition with a viscosity <10 poise at room temperature (25° C.) and a volume solids content of greater than 70 weight %.

Comparative Example 10

Preparation of a Polyester Polyol with a Hydroxyl Value of 220 mgKOH/q

TABLE 6

| Formulation of Polyester polyol of comparative Example 10 | |
| --- | --- |
| | Weight (g) |
| Pentaerythritol | 228.0 |
| Isophthalic Acid | 124.5 |
| Edenor V85 | 407.4 |
| Dibutyl tin oxide | 0.5 |

The Edenor V85 was charged to a reaction vessel fitted with a Dean and Stark apparatus, an overhead stirrer, a nitrogen source and a thermocouple. The polycarboxylic acid(s), polyol(s) and catalyst were dispersed in the liquid fatty acids. The reaction temperature was raised slowly to a maximum temperature of 240° C. whilst keeping the reaction mixture under an inert nitrogen atmosphere. Water was distilled from the reaction mixture to promote the esterification reaction. (An azeotropic solvent may be added to aid removal of water in the latter stages of the reaction). The reaction mixture was processed to an acid value of <5 mgKOH/g. The polyester was cooled to 50° C.

The product was liquid having a solvent free viscosity of 110 poise and a theoretical hydroxyl value (at 100% solids) of 210.

Comparative Example 11

Preparation of a Simple Paint and Cured Coating Using the Polymer of Example 10

TABLE 7

| Formulation of Paint of comparative Example 11 | |
| --- | --- |
| Component | Weight (g) |
| Example 10 Polymer | 83.2 |
| Titanium Dioxide | 102.0 |
| Xylene | 18.7 |

The titanium dioxide was added slowly to the stirred polyester polymer solution and dispersed under high shear until the pigment had a particle size of less than 20 μm (as measured by Hegman gauge). The xylene was added to thin back the paint.

Fifty parts by weight of the paint described above was mixed with 15.1 parts of Desmodur N3300 (a hexamethyl-enedi-isocyanate trimer commercially available from Bayer) and mixed. The mixed paint had a mix viscosity of 14.74 poise with a measured VOC of 112 g/l and a hard dry time of thirty minutes at 25° C.

Durability Testing—Resistance to UV Weathering

The durability with respect to resistance to UV weathering, of coatings prepared in Examples 5 to 8 and 11 were determined in accordance with ASTM D4587.

Performance was assessed by the change in gloss as a function of exposure time. A coating which retains 50% of its starting gloss after 3000 hours of testing is regarded as having good durability. The results of the testing are shown in FIG. 1.

FIG. 1 demonstrates that the durability of the coating is related to the OHV of the polyester polyol. The coatings comprising the polyester polyols of the present invention (Examples 5 to 8) have excellent durability and are also shown to have superior durability when compared to the comparative coating comprising a polyester polyol having an OHV of greater than 200.

The invention claimed is:

1. A coating composition having at least one of a solids content of greater than 70% by weight and a Volatile Organic Content (VOC) of less than 250 g/l, comprising a polyester polyol, the polyester polyol prepared from reactants comprising:
   a) from 10 to 40 weight percent of one or more polyols comprising 3 or more hydroxyl groups per molecule,
   b) from 10 to 40 weight percent of one or more aromatic polycarboxylic acids comprising 2 or more acid groups per molecule or corresponding ester(s) and/or anhydride(s) thereof, and
   c) from 30 to 75 weight percent of one or a mixture of $C_6$-$C_{20}$ monobasic fatty acids, wherein the one or the mixture of $C_6$-$C_{20}$ monobasic fatty acids have an iodine value of less than 30 cg/g and is a liquid in conformity with ASTM (1996) D4359-90, wherein the polyester polyol has a hydroxyl value (OHV) of greater than 60 and less than 200 mgKOH/g, and the weight percent of each component (a), (b) or (c) is the percentage of the weight of that component to the total weight of (a)+(b)+(c), and at least one isocyanate-functional curing agent, and wherein the coating composition is capable of curing at ambient temperature.

2. The coating composition of claim 1, wherein the polyester polyol is prepared from reactants comprising:
from 10 to 40 weight percent of component (a),
from 10 to 30 weight percent of component (b), and
from 35 to 75 weight percent of component (c) wherein the weight percent of each component (a), (b) or (c) is the percentage of the weight of that component to the total weight of (a)+(b)+(c).

3. The coating composition of claim 1 wherein the polyester polyol is prepared from reactants comprising:
from 17 to 30 weight percent of component (a),
from 14 to 25 weight percent of component (b), and
from 46 to 67 weight percent of component (c)
wherein the weight percent of each component (a), (b) or (c) is the percentage of the weight of that component to the total weight of (a)+(b)+(c).

4. The coating composition of claim 1, wherein the one or more polyols comprising 3 or more hydroxyl groups is pentaerythritol.

5. The coating composition of claim 1, wherein the one or the mixture of $C_6$-$C_{20}$ monobasic fatty acids is one or a mixture of $C_6$-$C_{14}$ fatty acids, or one or a mixture of $C_8$-$C_{10}$ fatty acids, wherein the one or the mixture of $C_6$-$C_{20}$ monobasic fatty acids have an iodine value of less than 30 cg/g.

6. The coating composition of claim 1, wherein the one or more aromatic polycarboxylic acids comprises one or a mixture of isophthalic acid, terephthalic acid and phthalic acid.

7. The coating composition of claim 1, wherein at least 50 mole % of the one or more aromatic polycarboxylic acids is isophthalic acid.

8. The coating composition of claim 1, wherein the polyester polyol has a number average molecular weight (Mn) ranging from 1000 to 5000.

9. The coating composition of claim 1, wherein the polyester polyol has a number average molecular weight (Mn) ranging from 1500 to 2500.

10. The coating composition of claim 1 having a viscosity in the range of 1 to 20 poise at 25° C.

11. The coating composition of claim 1, wherein the stoichiometric ratio of isocyanate groups: hydroxyl groups ranges from 0.5:1 to 3:1.

12. A substrate coated with the coating composition of claim 1.

13. A method of coating a substrate, the method comprising applying the coating composition of claim 1 to a substrate and allowing the coating composition to cure at an ambient temperature to form a coating layer on the substrate.

14. The coating composition of claim 1, in the form of a two-pack composition, one pack comprising the curing agent and the other pack comprising the polyester polyol.

15. The coating composition of claim 3, wherein the one or more polyols comprising 3 or more hydroxyl groups is pentaerythritol.

16. The coating composition of claim 3, wherein the one or the mixture of $C_6$-$C_{20}$ monobasic fatty acids is one or a mixture of $C_6$-$C_{14}$ fatty acids, or one or a mixture of $C_8$-$C_{10}$ fatty acids, wherein the one or the mixture of $C_6$-$C_{20}$ monobasic fatty acids have an iodine value of less than 30 cg/g.

17. The coating composition of claim 3, wherein the one or more aromatic polycarboxylic acids comprises one or a mixture of isophthalic acid, terephthalic acid and phthalic acid.

18. The coating composition of claim 3, wherein at least 50 mole % of the one or more aromatic polycarboxylic acids is isophthalic acid.

19. The coating composition of claim 3, wherein the polyester polyol has a number average molecular weight (Mn) ranging from 1500 to 2500.

20. The coating composition of claim 3 having a viscosity in the range of 1 to 20 poise at 25° C.

* * * * *